United States Patent [19]
Kimura

[11] Patent Number: 5,937,984
[45] Date of Patent: Aug. 17, 1999

[54] DAMPER DISC ASSEMBLY

[75] Inventor: Hiroshi Kimura, Neyagawa, Japan

[73] Assignee: Exedy Corporation, Neyagawa, Japan

[21] Appl. No.: 08/879,259

[22] Filed: Jun. 19, 1997

[30] Foreign Application Priority Data

Jul. 3, 1996 [JP] Japan ..................................... 8-173426

[51] Int. Cl.⁶ .................................................. F16D 13/58
[52] U.S. Cl. .................................... 192/70.17; 192/213.2
[58] Field of Search .............................. 192/70.17, 213.2, 192/70.16; 464/30 V, 68

[56] References Cited

U.S. PATENT DOCUMENTS

| | | | |
|---|---|---|---|
| 4,185,728 | 1/1980 | Gatewood | 192/213.2 |
| 4,613,029 | 9/1986 | Beccaris | 192/70.17 |
| 5,718,317 | 2/1998 | Hashimoto et al. | |

FOREIGN PATENT DOCUMENTS

| | | |
|---|---|---|
| 195 14 764 A1 | 10/1995 | Germany . |
| 196 26 687 A1 | 1/1997 | Germany . |
| 196 38 184 A1 | 3/1997 | Germany . |
| 2303424 | 2/1997 | United Kingdom . |

*Primary Examiner*—Charles A Marmor
*Assistant Examiner*—Saúl J. Rodríguez
*Attorney, Agent, or Firm*—Shinjyu An Intellectual Property Firm Osaka, Japan

[57] ABSTRACT

To provide a separate hub type damper disc assembly in which a force to be applied to engagement projections is reduced in view of the fatigue service life and a weight of a hub is reduced by reducing a size of the hub while maintaining a satisfactory durability of the hub, the damper disc assembly 1 includes a hub 2, a flange 3, first torsion springs 4, a clutch plate 5 and a retaining plate 6. The hub 2 has a plurality of engagement projections 2c and 2d on its outer circumferential portion. The flange 3 is disposed on the outer circumference of the hub 2 and has, in the inner circumferential portion, engagement cutaway portions 3b and receiving cutaway portions 3c. Engagement cutaway portions are engaged with the engagement projections 2c and 2d through a predetermined gap. The first torsion springs 4 are received in spaces defined by the adjacent engagement projections 2d and the receiving cutaway portions 3c. The clutch plate 5 is connected to the flange 3.

2 Claims, 4 Drawing Sheets

DAMPER DISC ASSEMBLY

BACKGROUND OF THE INVENTION

1. Field of the Invention

The present invention relates to a damper disc assembly, and more particularly to a separate hub type damper disc assembly.

2. Description of the Related Art

A damper disc assembly is typically provided with an input member, an output hub, and a torsion spring disposed between the input member and the output hub in the circumferential direction, for transmitting a torque between the input member and the output hub. Torque is typically supplied by an engine connected to a portion of the damper disc assembly. The torque is then transmitted to the input member. Engagement between the input member and the torsion spring then causes the torque to be transmitted to the output hub.

The damper disc assembly serves to transmit the torque and to reduce vibrations generated during toque transmission. When vibration is transmitted to the input member, the input member is subjected to repeated relative rotation relative to the output hub. In this case, the torsion spring is repeatedly expands and is compressed to absorb the vibrations.

In one such damper disc assembly, there has been provided an output hub that is formed with two separate portions, specifically, a hub and a flange. The hub 102 shown in FIG. 5 is just such a hub. The flange 103, shown in phantom in FIG. 5, is a generally annular member disposed about the outer radial periphery of the hub. The flange is configured to undergo limited relative rotation with respect to the hub 102. A second spring member (not shown in FIG. 5) is disposed between the hub 102 and the flange 103 in a space or cutaway 102s. With such an arrangement, it is possible to dampen vibrations in wide frequency and intensity ranges. When the twist vibration is transmitted from the engine to the damper disc assembly, if the twist vibration has a small displacement angle, low rigidity characteristics of the second spring member cause it to undergo expansion/compression between the hub and the flange. If the displacement angle is large, the high rigidity torsion spring is also subjected to repeated expansion/compression.

The flange 103 is formed with a cutaway corresponding to the cutaway 102s shown in FIG. 5. The hub 102 is also formed with a plurality of engagement projections 102c on its outer circumferential portion. The flange 103 has, in the circumferential portion, corresponding engagement portions that are shaped to engage the engagement projections 102c of the hub 102 in response to relative rotation therebetween.

The engagement projections 102c of the hub repeatedly engage corresponding engagement cutaway portions of the flange. An impact force is repeatedly applied to the engagement projections 102c of the hub 102 when the hub 102 and the flange 103 are brought into contact with each other through the relative rotation therebetween.

The impact force is repeatedly applied to both circumferential sides of the engagement projections 102c. The cutaway 102s is formed by cutting the hub in the vicinity of adjacent engagement projections 102c. Therefore, portions 102p are formed on the hub 102 on either circumferential side of the cutaway 102s. It has been found that the rigidity of the hub 102 is weakened in the vicinity of the portions 102p. Often, the portions 102p and the immediately adjacent engagement projection 102c undergo plastic deformation and may be bent. Such deformation and bending can result in fatigue, reduced dampening characteristics and eventual failure of the hub 102. Fatigue caused by the repeated stress applied to the engagement projections 102c adjacent to the cutaway 102s may considerably affect the durability of the hub 102. If the force applied to the engagement projections 102c could be reduced, it would be possible to reduce the size of the engagement projections while keeping the sufficient durability (fatigue service life), so that the weight of the hub may be reduced.

SUMMARY OF THE INVENTION

An object of the present invention is to provide a separate hub type damper disc assembly in which a force to be applied to engagement projections is reduced in view of the fatigue service life and a weight of a hub is reduced by reducing a size of the hub while maintaining a satisfactory durability of the hub.

In accordance with one embodiment of the present invention, a damper disc assembly includes a hub having a plurality of first engagement projections and a plurality of second engagement projection formed on an outer circumferential portion thereof, two of the second engagement projections defining a space therebetween. The damper disc assembly also includes a flange disposed about an outer circumference of the hub, the flange being formed with a plurality of engagement cutaway on an inner circumferential portion thereof, the plurality of engagement cutaway portions corresponding to the first and second engagement portions. Surfaces defined by the plurality of engagement cutaway portions are spaced apart from the first and second engagement portions by a predetermined gap. The surfaces of the plurality of engagement cutaway portions are configured to engage surfaces of the first engagement projections in response to relative rotation between the hub and the flange. The flange are further formed with a space on the inner circumferential portion corresponding to the space defined between the two of the second engagement projections. An elastic member is disposed in the space defined between the two of the second engagement projections and the space on the flange. Each of the second engagement projections are configured to engage only a corresponding one of the surfaces of the plurality of engagement cutaway portions in response to relative rotation between the hub and the flange.

In the damper disc assembly, when the input rotary member is rotated, the torque is transmitted from the input member through the flange to the hub and further outputted from the hub to the output rotary member. When the vibration is transmitted from the input rotary member to the damper disc assembly, the elastic member is subjected to repeated expansion/compression between the hub and the flange.

When the torque is transmitted from the flange to the hub, the hub and the flange are subjected to a relative rotation corresponding to the predetermined gap defined between the engagement projections of the hub and the engagement cutaway portions of the flange due to the variation of torque. The direction of the relative rotation is reversed when the torque transmitted is decreased. Thus, when the torque is increased, one surface, in the circumferential direction, of the first engagement projections of the hub confronting with the engagement cutaway portions of the flange is brought into contact with one end of the engagement cutaway portions. When the torque is decreased, the other surface of the first engagement projections thereof are brought into contact with the other end of the engagement cutaway portions. The first engagement projections of the hub are subjected to the force therefrom. These forces are repeatedly applied to the engagement projections due to the variation of torque. In contrast thereto, only one surface, in the circumferential direction, of the second engagement projections of the hub ever contacts a corresponding surface of the cutaway portions of the flange. Two second engagement projections define a single space for the elastic member. One of the two second engagement projections engages a surface of the flange in response to relative rotation between the flange and the hub in a first direction, and the other of the two second engagement projections engages a corresponding surface of the flange in response to relative rotation in a second direction. For this reason, the second engagement projections are subjected to fewer forces that the first engagement projections. The force only from the one side surface thereof is substantially applied thereto. In other words, the second engagement projections of the hub are subjected to the substantially less stress.

In the prior art structure, the engagement projections arranged on either side of the spring retaining space have a low rigidity (weakness) in comparison with that of the other engagement projections. The repeated collision forces are applied to the engagement portions having the low rigidity in the same way as in the other engagement projections. For this reason, the weakness of the engagement projections reduces the serviceable life of the device.

In the structure according to the present invention, the magnitude of the force applied to the second engagement projections is substantially reduced compared to the prior art. Thus, in view of the fatigue service life, the force applied to the engagement projections is reduced. The allowable maximum repeated stress (fatigue limit stress value) in the engagement projections of the hub for defining the space for receiving the elastic members together with the receiving cutaway portions of the flange is increased in comparison with that of the engagement projections of the prior art hub. Thus, it is possible to make the assembly small in size while keeping a satisfactory fatigue service life, thereby reducing the weight of the assembly. It is thus possible to keep a satisfactory fatigue service life of the flange without increasing the weight of the flange.

DESCRIPTION OF THE PREFERRED EMBODIMENTS

The present invention will now be described with reference to the accompanying drawings.

Figure 1:
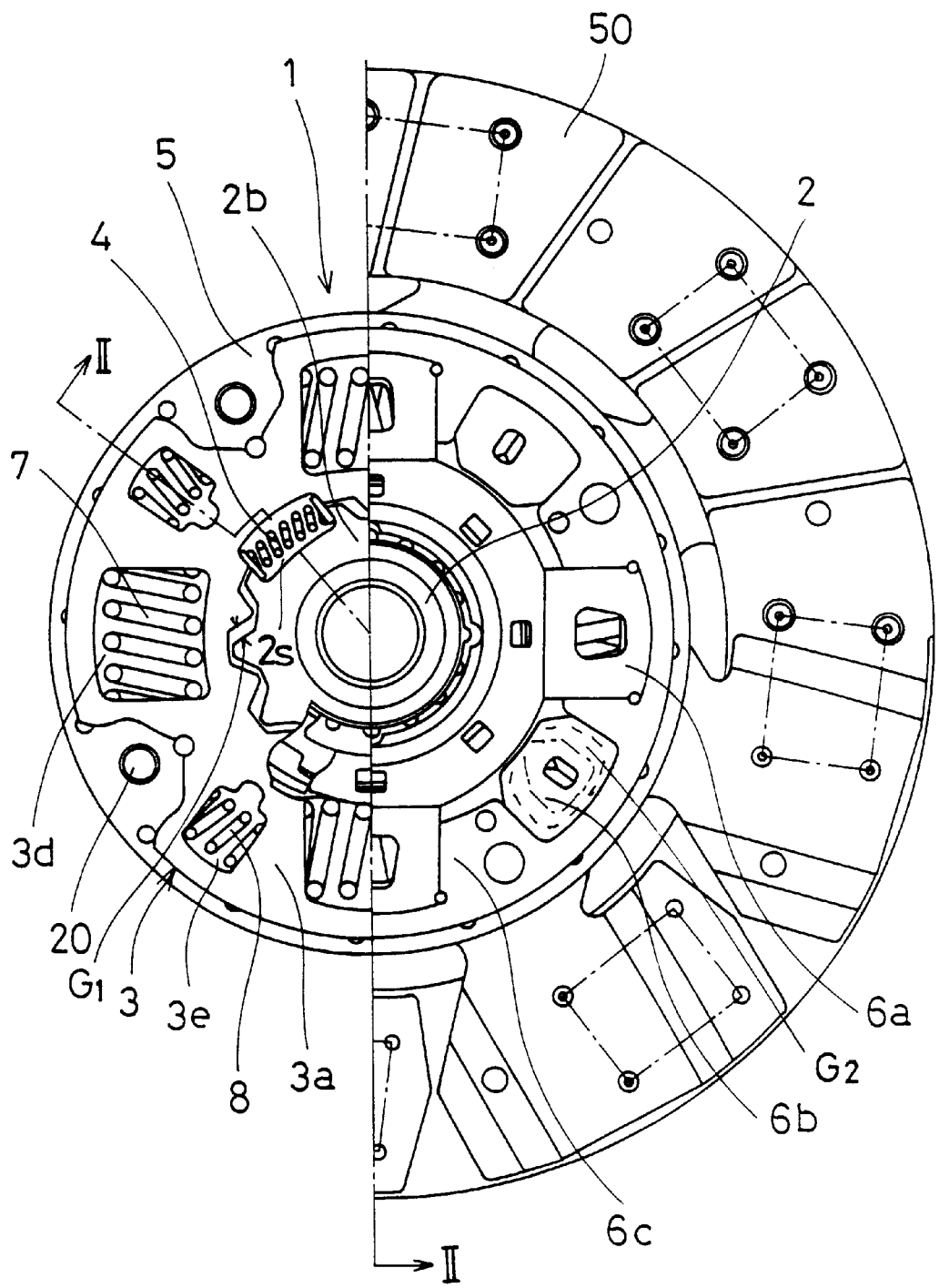
FIG. 1 is a fragmentary, part cutaway, part elevational plan view of a damper disc assembly in accordance with one embodiment of the present invention.
Figure 2:
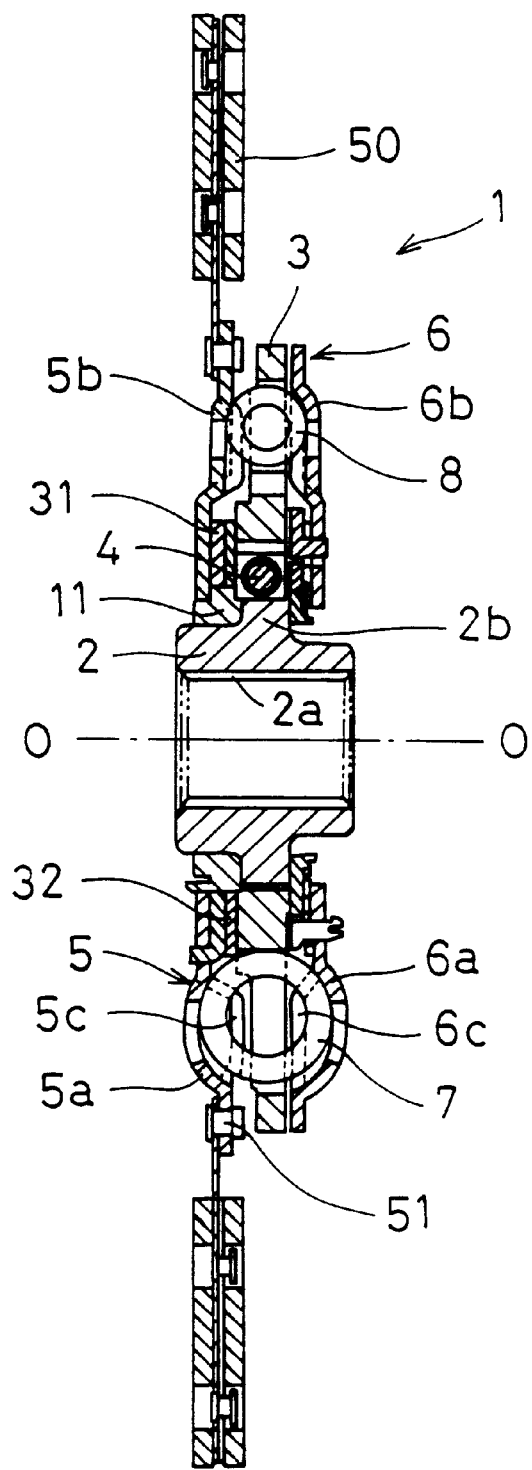
FIG. 2 is a cross-sectional view of the damper disc assembly depicted in FIG. 1, taken along the line II—II of FIG. 1 looking in the direction of the arrows.
Figure 3:
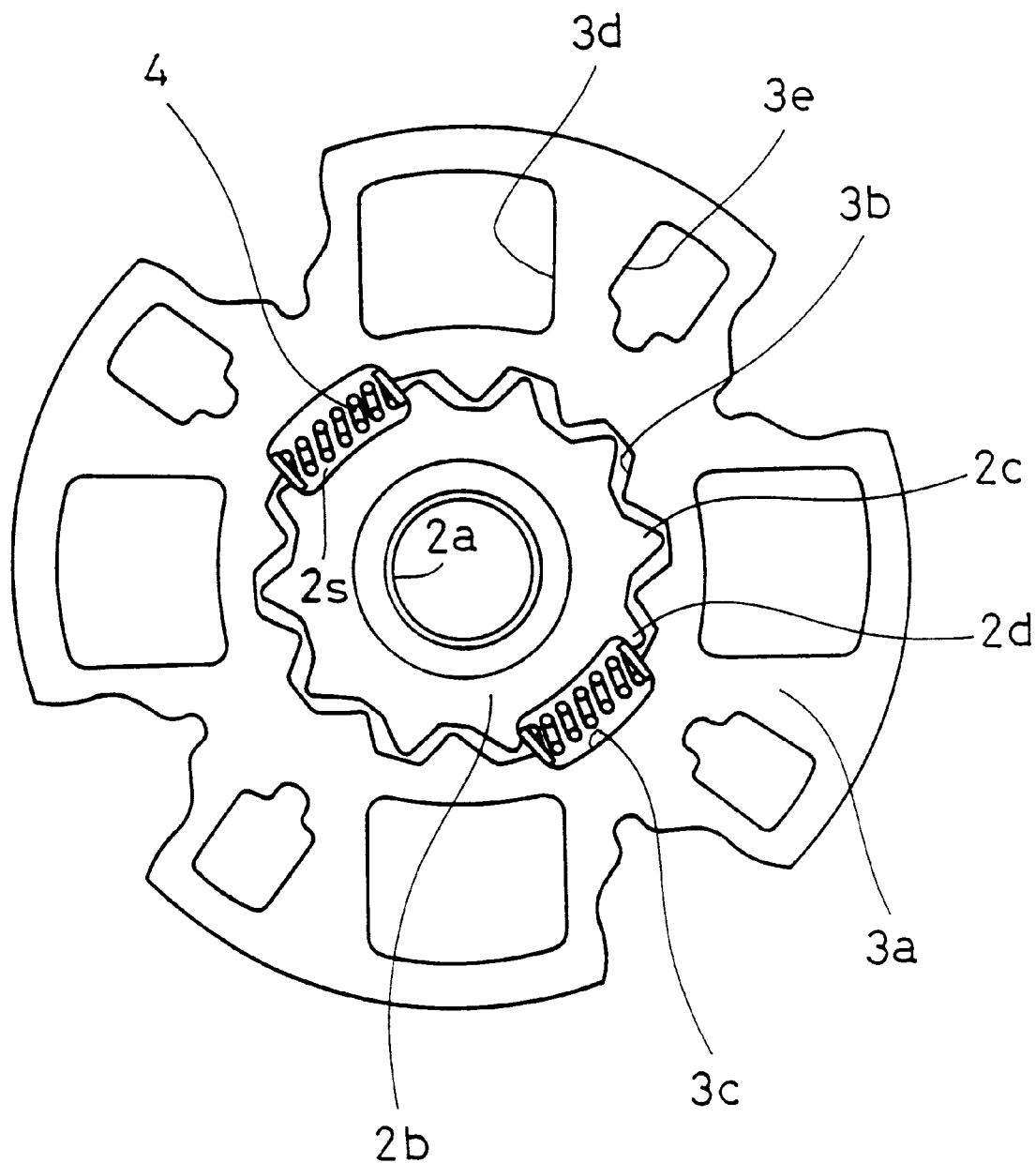
FIG. 3 is a plan view showing a hub, a flange and first torsion springs of the damper disc assembly depicted in FIGS. 1 and 2, with various parts removed for clarity.

FIGS. 1, 2 and 3 show a damper disc assembly 1 in accordance with one embodiment of the present invention.

In FIG. 2, line O—O designates a central axis of rotation about which the damper disc assembly 1 rotates. The damper disc assembly 1 is mainly composed of a hub 2, a flange 3, first torsion springs 4 (elastic member), a clutch plate 5, a retaining plate 6, second torsion springs 7, and third torsion springs 8. With respect to FIG. 2, when installed in an automotive vehicle, the damper disc assembly 1 is disposed between an engine and a transmission of the automotive vehicle. The engine is to the left of FIG. 2 and the transmission is to the right of FIG. 2 with the damper disc assembly 1 installed. Hereinafter, for directional orientation, the left side of FIG. 2 will be referred to as the engine side and the right side of FIG. 2 will be referred to as the transmission side.

The hub 2 connects to a shaft (not shown) of the transmission, the shaft serving as an output member. The hub 2 is shown separately in FIG. 4 with all other parts removed for clarity. The hub 2 is formed with a spline hole 2a the center of the damper disc assembly 1. The spline hole 2a engages the unillustrated shaft. Also, as shown in FIGS. 2 and 3, a projection 2b extending radially outwardly is formed integrally with the hub 2. Engagement projections 2c and engagement projections 2d are formed on the outer circumference of the projection 2b. The engagement projections 2c are engaged with engagement cutaway portions 3b of the flange 3. Each engagement projection 2d has two faces which extend generally radially outward. A first face of the two faces is engagable with a corresponding face of the engagement cutaway portion 3b of the flange 3, and a second face of the two faces is contactable with one end of the first torsion spring 4.

The flange 3 is disposed around the outer circumference of the hub 2 and is a generally thick plate member formed with a disc portion 3a, the engagement cutaway portions 3b, receiving cutaway portions 3c, first windows 3d and second windows 3e, as is shown more clearly in FIG. 3. Each engagement cutaway portion 3b is shaped to engage with the engagement projection 2c in response to relative rotary displacement therebetween. With the damper disc assembly 1 in a torsion free state, where no torque is transmitted, a predetermined gap $G_1$ is defined between each engagement cutaway portion 3b each corresponding engagement projection 2c. The first windows 3d and the second windows 3e are formed in the disc portion 3a and alternate with respect to one another in the circumferential direction in the flange 3.

Figure 4:
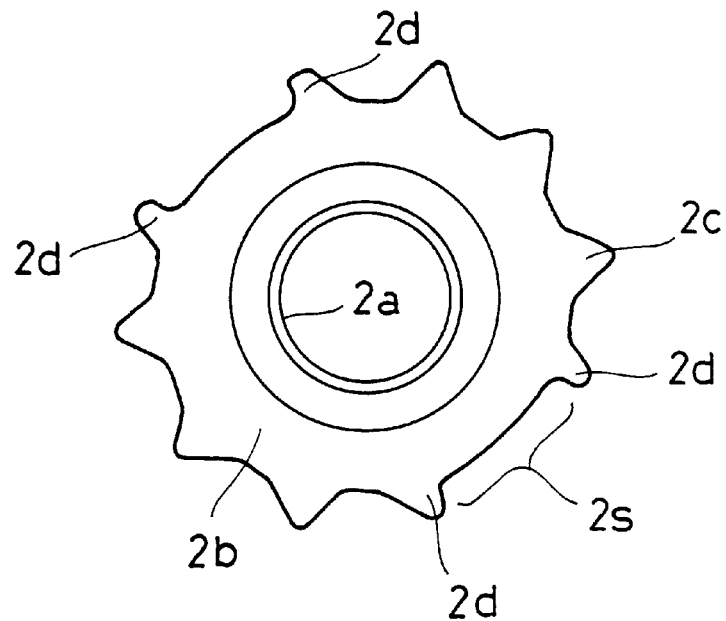
FIG. 4 is a plan view showing the hub depicted in FIG. 3, on a slightly enlarged scale, shown with all other parts removed for clarity.

Each first torsion spring 4 is disposed in a space 2s defined between adjacent engagement projections 2d of the hub 2 and corresponding receiving cutaway portions 3c of the flange 3, as shown in FIGS. 1, 3 and 4. The ends of the first torsion spring 4 are circumferentially confined in the space 2s between the adjacent engagement projections 2d and the receiving cutaway portion 3c. The first torsion spring 4 is compressed and expends in response to relative rotary displacement between the adjacent engagement projections 2d and the receiving cutaway portion 3c.

The clutch plate 5 and the retaining plate 6 are disc-like plates and together define an input member. The clutch plate 5 and the retaining plate 6 are disposed on opposite sides of the flange 3 and may be rotatably engaged from the outside in the axial direction of the hub 2. The two plates 5 and 6 are connected to each other at an outer circumferential portion thereof by stop pins 20, which are described in greater detail below. The plates 5 and 6 have first receiving portions 5a and 6a, second receiving portions 5b and 6b, and spring retaining portions 5c and 6c, respectively. An inner circumferential edge of the clutch plate 5 is supported by the hub 2 through an annular bushing 11. A frictional member 50 is fixed to an outer circumferential portion of the clutch plate 5 by rivets 51. The frictional member 50 acts as an input rotary member and together with the remaining portions of the damper disc assembly 1 defines a clutch disc assembly. The two plates 5 and 6 surround the hub 2, the flange 3 and the first torsion springs 4. A spacer plate 31 engages the clutch plate 5 and rotates therewith. An annular friction plate 32 is disposed between the flange 3 and the spacer plate 31.

The second torsion springs 7 are disposed in the first windows 3d of the flange 3. The second torsion springs 7 are positioned such that their central axes are tangentially oriented with respect to the circumference of the flange 3. The end faces of the second torsion springs 7 are in contact with circumferential ends of each first window 3d and are also in contact with the spring retainer portions 5c and 6c of the respective two plates 5 and 6 when the damper disc assembly 1 is in a torsion free state. The first receiving portions 5a and 6a of the two plates 5 and 6 are formed to partially cover the second torsion springs 7 so that the second torsion springs 7 are able to be compressed and expand along the axial length of the second torsion springs 7, but are retained axially with respect to the central axis O—O of the damper disc assembly between the first receiving portions 5a and 6a in the first windows 3d.

The third torsion springs 8 are arranged in the second windows 3e of the flange 3 so that their axes are tangentially oriented with respect to the circumference of the flange 3. The axial end faces of the third torsion spring 8 are in contact with circumferential end faces of the first windows 3d, respectively. However, with the damper disc assembly 1 in a torsion free state, a predetermined gap $G_2$ is defined between the axial end faces of the third torsion spring 8 and the spring retainer portions 5c and 6c of the two plates 5 and 6. The second receiving portions 5b and 6b of the two plates 5 and 6 are arranged so as to clamp the third torsion springs 8 so that the third torsion springs 8 are prevented from being displaced from the second windows 3e in the axial direction with respect to the hub 2.

The operation will now be described.

When the torque is transmitted to the frictional member 50 of the clutch disc, the torque is transmitted to the clutch plate 5 and the retaining plate 6 connected to the clutch plate 5. The torque transmitted to the two plates 5 and 6 is transmitted to the flange 3 through the second torsion springs 7 and further to the hub 2.

In this case, if the vibration is of a low intensity, the first torsion springs 4, which have the low rigidity, are compressed by the relative rotation between the hub 2 and the flange 3. When the intensity of the vibration increases and the transmission torque is increased, the first torsion springs 4 are further compressed, and the gap $G_1$ is eliminated due to contact between engagement cutaway portions 2c and 2d of the hub 2 and the engagement cutaway portions 3b of the flange. Contact between the hub 2 and the flange 3 causes them to rotate together in a single unit. Thereafter, relative rotation between the flange 3 and the two plates 5 and 6 may occur so that the second torsion springs 7 are compressed between the circumferential ends of the first windows 3d of the flange 3 and the spring retainer portions 5c and 6c of the two plates 5 and 6. As the load increases, the second torsion springs 7 are further compressed and eventually, the end faces of the third torsion springs 8 and the spring retainer portions 5c and 6c of the two plates 5 and 6 come into engagement eliminating the gap $G_2$ at one end of each spring 8 and any further subsequent displacement between the flange 3 and the plates 5 and 6 causes compression of the third torsion springs 8.

When the hub 2 and the flange 3 undergo relative rotation therebetween, if there is sufficient force or torque, the gap $G_1$ is eliminated between corresponding surfaces of each engagement projection 2c of the hub 2 and the end face of the associated engagement cutaway portion 3b of the flange 3 as the first torsion spring 4 is compressed. Consequently, there is engagement between the engagement projections 2c and the engagement cutaway portions 3b. In this case, the force caused by the contact between the engagement projections 2c and the engagement cutaway portions 3b is applied to the engagement projections 2c. When the torque is reduced, the hub 2 and the flange 3 are relatively rotated in the opposite direction to that of the case where the torque is increased, so that the gap $G_1$ between the other surfaces, in the circumferential direction, of the engagement projections 2c and the other end face of the engagement cutaway portions 3b is decreased. Eventually, the circumferentially opposite engagement projections 2c and the engagement cutaway portions 3b collide with each other. In the above described relative rotary displacement, both circumferential sides of the engagement projections 2c repeatedly contact corresponding side of the engagement cutaway portions 3b. Thus, impacting force is applied to the engagement projections 2c of the hub 2 in a repeated manner due to the torque variation.

In a similar manner, one side of each of the engagement projections 2d undergo repeated collision with the engagement cutaway portions 3b. However, the opposite side of each of the engagement projections 2d engages the torsion springs 4. Therefore, the forces acting on the engagement projections 2d differs from the forces acting on the engagement projections 2c. Specifically, the engagement projections 2c are repeatedly acted upon by impacting forces that come from two opposite circumferential directions. Whereas each of the engagement projections 2d only experiences impacting forces that come from a single circumferential directions. Therefore, the engagement projections 2d are less likely to fail or become worn due to fatigue.

In other words, each of the engagement projections 2d only experiences collision with relative rotations of the hub 2 and the flange 3 in one direction. Namely, when there is relative rotation between the hub 2 and the flange 3 in a first direction, one of the engagement projections 2d may collide with the adjacent surface of the engagement cutaway portions 3b. When there is relative rotation between the hub 2 and the flange 3 in a second direction, opposite the first direction, the other of the engagement projections 2d may collide with the opposing adjacent surface of the engagement cutaway portions 3b. The service life of engagement projections 2c is therefore prolonged because impact forces in one direction are eliminated, when compared to the prior art. The engagement projections 2d may therefore remain relatively rigid when subjected to the elastic reactive force produced by compression of the first torsion springs 4. Since the elasticity of the torsion springs 4 is small, this elastic reactive force is much smaller than the force applied upon the above-described collision and may be neglected when considering mechanical strength. For this reason, the engagement projections 2c are subjected to the repeated forces from both side surfaces, whereas the engagement projections 2d are subjected to the repeated force only from the one surface. In this case, in view of the fatigue service life, the stress value of the engagement projections 2d caused by the effect of the force is not evaluated by the fatigue limit defined by the S-N curve (interactive curve of stress-repeated number) of both-sided amplitudes but it is possible to evaluate the stress value of the fatigue limit by the S-N curve of the one-sided amplitude.

According to the present invention, it is possible to provide a separate hub type damper disc assembly in which a force to be applied to engagement projections is reduced in view of the fatigue service life and a weight of a hub is reduced by reducing a size of the hub while maintaining a satisfactory durability (fatigue service life) of the hub.

Figure 5:
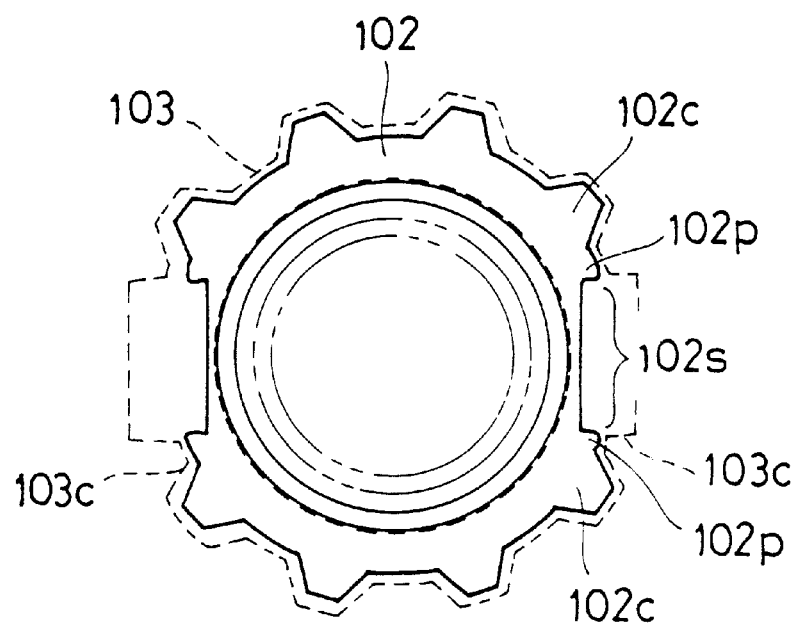
FIG. 5 is a plan view of a prior art hub.

To further illustrate the advantages of the present invention, comparison is provided between a prior art hub 102 in FIG. 5 and the hub 2 of the present invention. The engagement projections 102c of the prior art hub 102 do not extend to a position adjacent to the cutaways 102s, but rather, the engagement projections 102c are spaced apart from the cutaway 102s. As shown in phantom, a flange member 103 is formed with corresponding engagement projections which have surfaces configured to engage the surfaces of the projections 102c. The projections 102c all experience collisions from both circumferential directions due to relative rotation between the hub 102 and the flange 103. However, in the present invention, each of the engagement projections 2d only experience collisions in one rotation direction. In the prior art hub 102, the engagement projections 102c adjacent to the cutaway 102s have only a small portion 102p of the hub 102 as circumferential support adjacent to the cutaway 102s. Therefore, fatigue of the engagement projections 102c adjacent to the cutaway 102s is much more likely than in the present invention.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A damper disc assembly for transmitting a torque between an input rotary member and an output rotary member, comprising:

a hub having a plurality of first engagement projections and a plurality of second engagement projections formed on an outer circumferential portion thereof, two of said second engagement projections defining a space therebetween, said two of said second engagement projections defining opposing circumferential end surfaces within said space;

a flange disposed about an outer circumference of said hub, said flange being formed with a plurality of engagement cutaway on an inner circumferential portion thereof, said plurality of engagement cutaway portions corresponding to said first and second engagement portions, surfaces defined by said plurality of engagement cutaway portions being spaced apart from said first and second engagement portions by a predetermined gap, said surfaces of said plurality of engagement cutaway portions being configured to engage surfaces of said first engagement projections in response to relative rotation between said hub and said flange, said flange further formed with a space on said inner circumferential portion corresponding to said space defined between said two of said second engagement projections, said space formed on said flange having opposing circumferential end surfaces;

an elastic member disposed in said space defined between said two of said second engagement projections and said space on said flange, said elastic member engaging said circumferential end surfaces of said space of said hub and said circumferential end surfaces of said flange with the damper disk assembly in a torsion free state; and wherein each of said second engagement projections are configured to engage only a corresponding one of said surfaces of said plurality of engagement cutaway portions in response to relative rotation between said hub and said flange.

2. The damper disc assembly as set forth in claim 1, wherein surfaces defined between adjacent pairs of said first engagement projections define a first radius with respect to said hub, a surface defined between adjacent ones of said first and second engagement projection also define said first radius, and a surface in said space of said hub between said circumferential end surfaces defines a second radius that is larger than said first radius.

* * * * *